United States Patent
Geidarov

(10) Patent No.: US 9,803,542 B1
(45) Date of Patent: Oct. 31, 2017

(54) ROTARY INTERNAL COMBUSTION ENGINE

(71) Applicant: Asker Askerovich Geidarov, Moscow (RU)

(72) Inventor: Asker Askerovich Geidarov, Moscow (RU)

(*) Notice: Subject to any disclaimer, the term of this patent is extended or adjusted under 35 U.S.C. 154(b) by 0 days.

(21) Appl. No.: 15/459,040

(22) Filed: Mar. 15, 2017

(30) Foreign Application Priority Data

Apr. 6, 2016 (RU) .................................. 2016113127

(51) Int. Cl.
| | |
|---|---|
| *F02B 55/02* | (2006.01) |
| *F02B 55/08* | (2006.01) |
| *F02B 53/04* | (2006.01) |
| *F02B 55/14* | (2006.01) |
| *B23F 15/08* | (2006.01) |

(52) U.S. Cl.
CPC .............. *F02B 55/02* (2013.01); *B23F 15/08* (2013.01); *F02B 53/04* (2013.01); *F02B 55/08* (2013.01); *F02B 55/14* (2013.01); *Y02T 10/17* (2013.01)

(58) Field of Classification Search
CPC .......... F02B 55/02; F02B 55/08; F02B 53/04; F02B 55/14; Y02T 10/17; B23F 15/08
See application file for complete search history.

(56) References Cited

U.S. PATENT DOCUMENTS

| | | | |
|---|---|---|---|
| 3,809,022 A | 5/1974 | Dean, Jr. | |
| 5,293,849 A * | 3/1994 | Huckert | F02B 53/00 123/221 |
| 6,230,681 B1 * | 5/2001 | Kiseljev | F01C 3/06 123/221 |
| 2009/0255507 A1 * | 10/2009 | Althen | F01C 3/02 123/246 |

FOREIGN PATENT DOCUMENTS

| | | | | |
|---|---|---|---|---|
| DE | 4127870 A1 * | 1/1992 | | F01C 3/02 |
| GB | 936283 A | 9/1963 | | |
| GB | 2062105 A * | 5/1981 | | F01C 3/02 |
| RU | 2044893 C1 | 9/1995 | | |
| RU | 2612873 C1 | 3/2017 | | |

OTHER PUBLICATIONS

Search report in RU 2016113127 dated Sep. 29, 2016.

* cited by examiner

*Primary Examiner* — Mark Laurenzi
*Assistant Examiner* — Wesley Harris
(74) *Attorney, Agent, or Firm* — Bardmesser Law Group

(57) ABSTRACT

Rotary internal combustion engine includes a body made of four parts, each of which is an L-shaped fragment, and, when connected, forming two mutually perpendicular ring-shaped walls in plan view with ribs on the outer surface and an annular groove inside, which form two passages, each of which contain a torus-shaped rotor, which can move along the groove. Each torus-shaped rotor has longitudinal notches located outside or inside the rotor forming cavities between the rotor and groove surface, connected to chambers located outside the walls. The intake and exhaust windows are made in the walls communicating with the cavities between the rotor and groove surface. The rotors are interconnected by the kinematic chain of rotation synchronization made of successively engaged gears, one of which is engaged with one torus-shaped rotor, and the last of the gears is engaged with the output shaft, rigidly connected with another torus-shaped rotor.

3 Claims, 4 Drawing Sheets

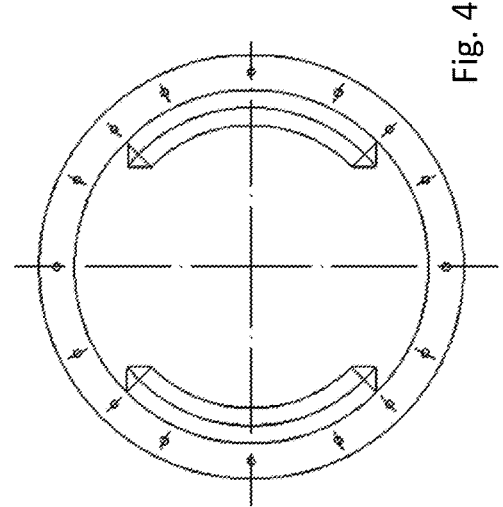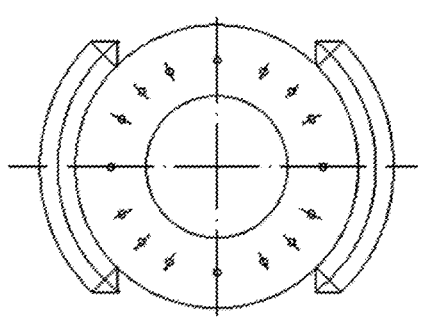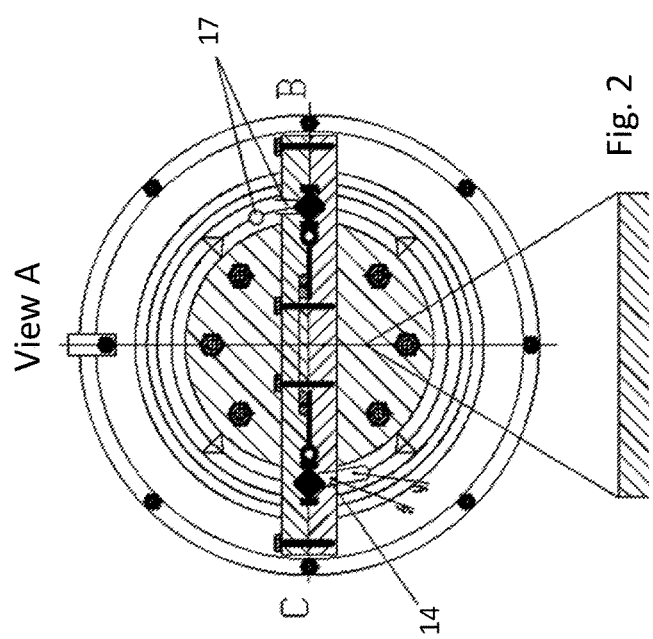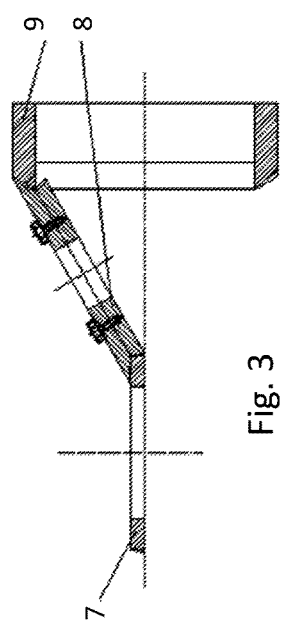

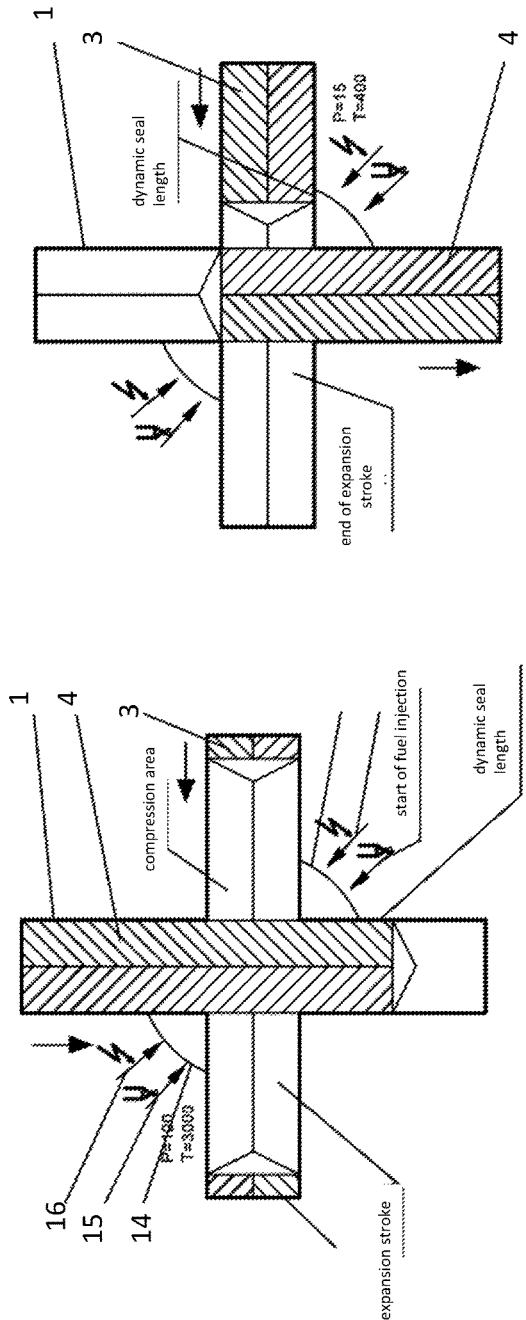
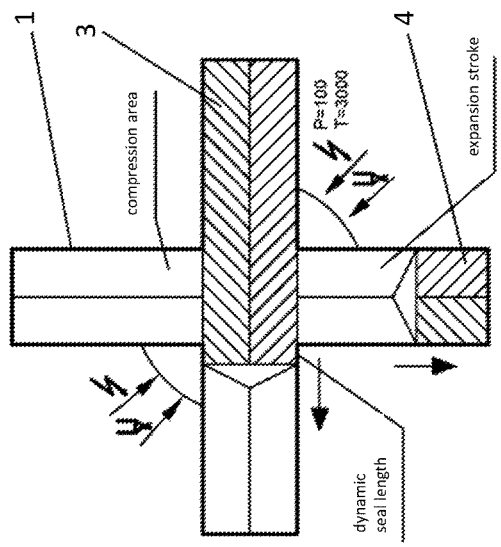
FIG. 6
FIG. 7
FIG. 8

ROTARY INTERNAL COMBUSTION ENGINE

CROSS-REFERENCE TO RELATED APPLICATIONS

This application claims priority to RU patent application No. 2016113127, filed on Apr. 6, 2016, which is incorporated herein by reference in its entirety.

BACKGROUND OF THE INVENTION

Field of the Invention

The invention relates to mechanical engineering and more particularly to engine construction and considers the internal combustion engine (ICE) design, which may be applied as a drive mechanism for a wide range of vehicles.

Description of the Related Art

The principle of variable volume formation, when two rotors move, is known and described in detail in many publications. The main issue for mechanics of this type of designs is the rotor synchronization system. Most known designs include shafts and gears. At the same time, the use of shafts is highly undesirable in the synchronization system, since alternating loads on shafts lead to maximum shaft rotation, and, consequently, it is necessary to decrease the rotor segment to avoid rotor collision while moving, resulting in an increase of parasitic volume (discussed below).

Moreover, a number of designs follow the path of rotor "convergence", which is achieved by non-perpendicular planes of rotor spinning to ensure a minimum length of the shaft. Gear minimization in the synchronization system is important, because manufacturing of gears with a large diameter to rotate with high peripheral speeds is extremely difficult or at times technologically unachievable at this stage of development of mechanical engineering technologies. For this purpose one has to reduce the rotor "diameter", which results in reduction of engine "volume" and limits its applicability.

Many designs often do not give due consideration to the end faces of rotors. To provide maximum torque transmission and reduce transverse loads on rotors, the rotor end faces are "tapered" symmetrically. Moreover, "the taper length" is a half of the maximum size in the rotor cross section, which will ensure smooth passage of rotors through the points of intersection of rotation toroids. When the "taper" of one rotor reaches the point of intersection of toroid grooves, the moment when other sector of another rotor comes out of the body, and the variable volume cavity seal is lost, takes place in the body, and the remaining volume is called "parasitic". If the chambers are not heat insulated, its presence results in decrease of thermodynamic efficiency, and parasitic volume increases specific volume performance of engine, which deteriorates the design parameters. Consequently, when designing, it is necessary to reduce the parasitic volume. However, the rotor spinning non-perpendicular planes, as well as the small-diameter shafts in the synchronization system lead to an increase of parasitic volume. A number of designs include an asymmetric rotor that increases the design imbalance or leads to weighting at the attempt to mitigate this effect. The three disc segment is shown in one design, which is not optimal, since it increases the engine dimensions by means of efficient increase of parasitic volume due to an increased number of points of intersection. It is not difficult to conclude that a two-sector rotor, which is used in this design, is an optimum one.

There are two types of rotor synchronization systems, which differ in the type of torque pick-off with a large diameter of rotor, let us call it the external engagement rotor, by means of bevel or dome gear.

One type is described in patents GB936283 (see FIG. 28 of the reference), U.S. Pat. No. 3,809,022, DE2034300, EP0091975, GB2062105, GB191007516, JP3718219 and U.S. Pat. No. 5,293,849. All these designs have one major disadvantage—the high peripheral speed of gear of the external engagement rotor. The rotor spinning non-perpendicular planes are used in a number of designs as well, which reduces efficiency.

The second type is described in GB936283 (see FIGS. 23, 24, 33 of the reference). This approach discloses a rotary internal combustion engine, including a body made up of two tubular intercrossing parts with annular grooves each, which form two passages for piston movement, and the intake and exhaust windows are made in the walls communicating with cavities of annular grooves, and the tubular parts are interconnected by a kinematic chain of rotation synchronization made of engaged gears. The designs with a shaft are described in the synchronization system (see FIGS. 23, 24, 33 of the reference). The synchronization system in FIG. 23 comprises two shafts, one of which is an intermediate shaft, and another one is intended for gear fastening. Moreover, the system in FIG. 23 of the reference is bulky. Although the synchronization system in FIG. 24 contains only one intermediate shaft, it still has a gear of size 133, which is not significantly smaller than that used in the first type, and, therefore, it does not solve the manufacturability problem. Nevertheless, the design is bulky. The system shown in FIG. 33 of GB936283 is of particular interest. Only one bevel gear and pinion is used in it, the system is compact, but it has a very long intermediate shaft and non-perpendicular planes of rotor spinning, which substantially reduces its efficiency. The rotation speed of intermediate shaft is several times greater than the rotor rotation speed (bevel or cylindrical gear has K=2-3), which significantly increases the requirements on its construction materials.

SUMMARY OF THE INVENTION

Accordingly, the present invention is related to a rotary internal combustion engine that substantially obviates one or more of the disadvantages of the related art.

In one embodiment, a rotary internal combustion engine includes a body made of four parts, each part in a form of an L-shaped fragment, wherein, when the L-shaped fragments are connected, they form two mutually perpendicular ring-shaped walls in plan view with ribs on the outer surface and an annular groove inside. The L-shaped fragments further form two passages, each of which contains a torus-shaped rotor adapted to move along the annular groove. Each torus-shaped rotor includes longitudinal notches located outside or inside the rotor forming cavities between the rotor and annular groove surface. The longitudinal notches are connected with combustion chambers located outside the walls. The walls include the intake and exhaust windows for communication of the cavities between the rotor and groove surface, and to provide spinning of the torus-shaped rotors at equal rotation speed. The rotors are interconnected by a kinematic chain of rotation synchronization made of successively engaged gears, one of which is engaged with one torus-shaped rotor, and a last of the gears is engaged with an output shaft, which is rigidly connected with another torus-shaped rotor. The kinematic chain includes two pairs of gears with a common double gear and outermost gears. The inlet windows are elongated along an arc adapted for adjustment of a length of the inlet windows.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 2 shows View A according to FIG. 1;

FIG. 3 shows a gear engagement;

FIG. 4 shows a rotor with larger diameter in plan view;

FIG. 5 shows a rotor with smaller diameter in plan view;

FIG. 6 shows the start of compression stroke/expansion stroke;

FIG. 7 shows the end of compression stroke/the start of combustion stroke;

FIG. 8 shows the end of combustion stroke/the start of expansion stroke.

DETAILED DESCRIPTION OF THE PREFERRED EMBODIMENTS

Reference will now be made in detail to the preferred embodiments of the present invention, examples of which are illustrated in the accompanying drawings.

The present invention is intended to achieve the technical result consisting in design simplification by minimization of parasitic volume of a rotary engine with exact orientation of rotors and ensuring accurate rotor spinning synchronization and exclusion of shafts in the rotor synchronization system.

Figure 9:
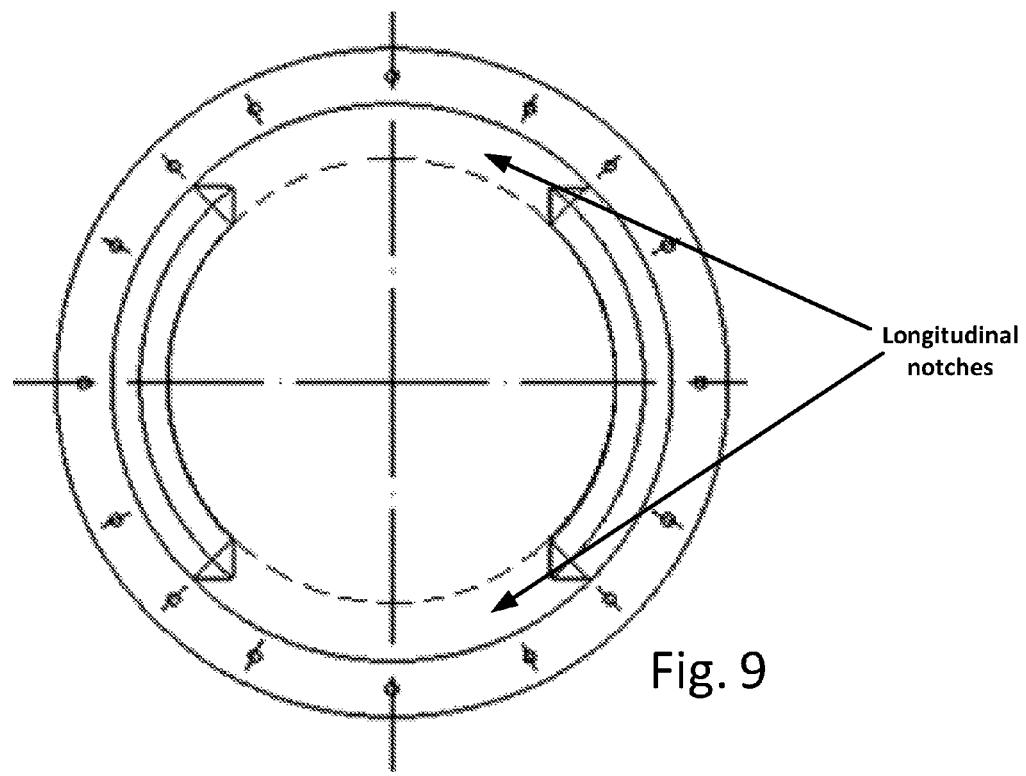
FIGS. 9 and 10 show the longitudinal notches in plan view.
Figure 10:
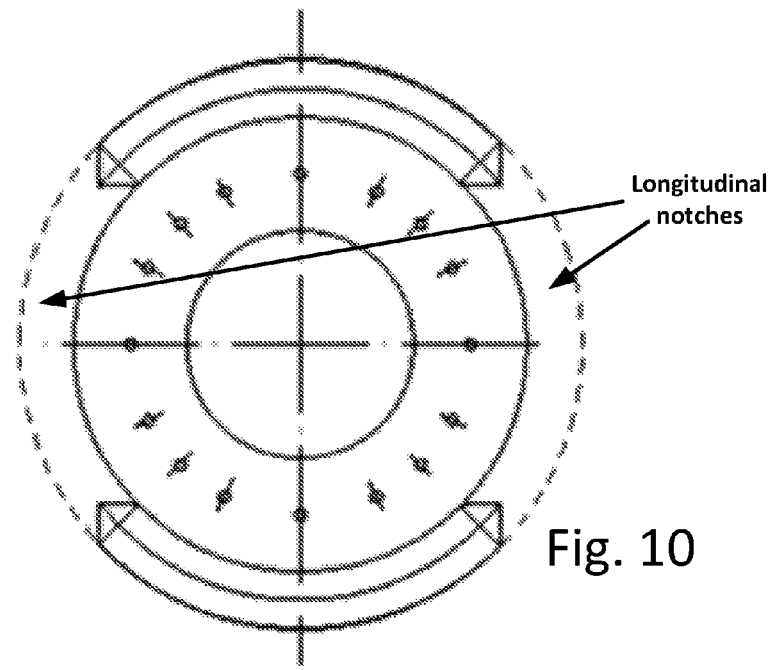

The technical result is achieved by the fact that the rotary internal combustion engine comprises a body made up of four parts, each of which is an L-shaped fragment, and, when connected, they form two mutually perpendicular ring-shaped walls in plan view with ribs on the outer surface and an annular groove inside, which form two passages, each of which contain a torus-shaped rotor, which can move along the groove, and each torus-shaped rotor is made with longitudinal notches (see FIGS. 9 and 10 showing the longitudinal notches in plan view) located outside or inside the rotor forming cavities between the rotor and groove surface, which are connected with the chambers located outside the walls, and the intake and exhaust windows are made in the walls communicating with the cavities between the rotor and groove surface, and said rotors are interconnected by the kinematic chain of rotation synchronization made of successively engaged gears, one of which is engaged with one torus-shaped rotor, and the last of the gears is engaged with the output shaft, rigidly connected with another torus-shaped rotor.

These features achieve the desired technical result.

The present invention is illustrated by a specific embodiment, which, however, is not the only possible one, but it demonstrates the possibility to achieve the desired technical result.

Figure 1:
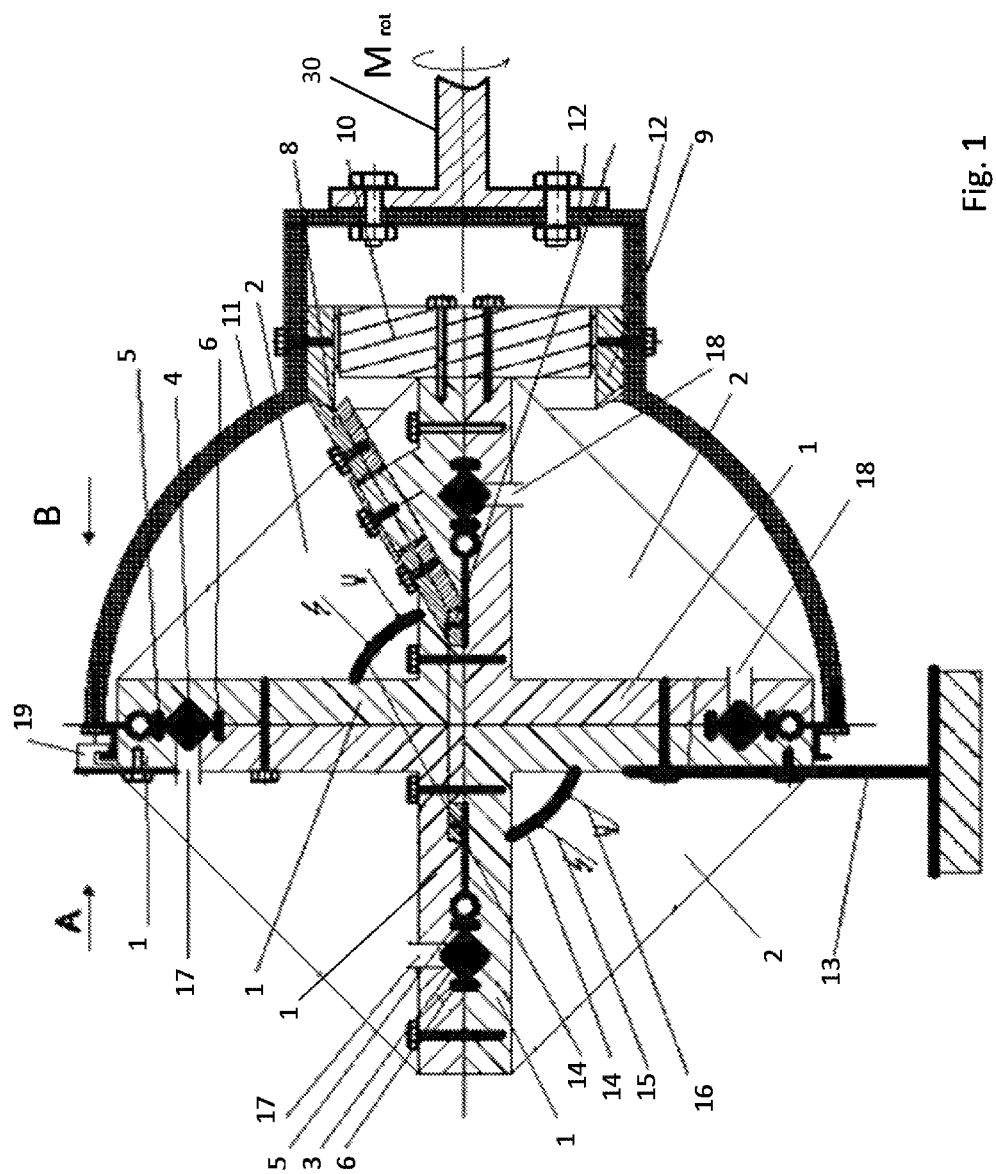
FIG. 1 shows a longitudinal cross section of the internal combustion engine (ICE) according to the invention.

FIG. 1 shows a longitudinal cross section of the internal combustion engine (ICE) according to the invention;

FIG. 2 shows View A according to FIG. 1;

FIG. 3 shows a gear engagement;

FIG. 4 shows a rotor with larger diameter in plan view;

FIG. 5 shows a rotor with smaller diameter in plan view;

FIG. 6 shows the start of compression stroke/expansion stroke;

FIG. 7 shows the end of compression stroke/the start of combustion stroke;

FIG. 8 shows the end of combustion stroke/the start of expansion stroke.

According to the present invention, the design of the dome type rotary ICE (intake-compression-combustion-expansion (expansion stroke)-exhaust) with synchronization system is considered.

In general, the rotary internal combustion engine comprises a body made up of four parts, each of which is an L-shaped fragment, and, when connected, they form two mutually perpendicular ring-shaped walls in plan view with ribs on the outer surface and an annular groove inside, which form two passages, each of which contain a torus-shaped rotor, which can move along the groove. Each torus-shaped rotor is made with longitudinal notches located outside or inside the rotor forming cavities between the rotor and groove surface, which are connected with the chambers located outside the walls (see FIGS. 9 and 10 showing the notches).

The intake and exhaust windows are made in the walls communicating with the cavities between the rotor and groove surface. To provide spinning of the torus-shaped rotors with equal rotation speed, the rotors are interconnected by the kinematic chain of rotation synchronization made of successively engaged gears, one of which is engaged with one torus-shaped rotor, and the last of the gears is engaged with the output shaft (see element 30 in FIG. 1), rigidly connected with another torus-shaped rotor.

A specific embodiment is considered below, in view of FIGS. 1-8.

The rotary ICE comprises a body, which includes four quadrants 1 (hereafter referred to as the "quarters") with selected reinforcing ribs 2, in one of which the double gear fastening system 8 of synchronization and power pick-off system is arranged. The quarter sides facing the rotor 3 with power pick-off along the inner radius are rigidly connected along the outside radius and in the center, and the quarter sides facing the rotor 4 with external power pick-off are rigidly connected along an inner radius. The quarter sides are bolted in the preferred embodiment.

Moreover, the reinforcing ribs reinforce the body in places where significant body deformations take place in the variable volume chambers created by moving rotors due to gas pressure. The body also includes perpendicular cavities (toroidal grooves of a definite shape with a profile, which is complementary to the rotor profiles) for rotation of rotors 3 and 4, as well as cavities for fastening the rotor spinning orientation system on rotating bearings (they are depicted in the form of hollow circles on rotors in FIG. 1). The rotors shown in FIG. 2 are toroids of a specific cross profile, which form the variable volume chambers during rotation in perpendicular planes near the points C and B, which are expansion (expansion stroke), compression, exhaust and filling chambers. Two symmetrical 90-degree segments are selected on the rotors, and the rotor end faces are symmetrically tapered along the length of the rotor (the taper shape has a specific profile) along the generating line forming a ¼ of the rotor cross profile width size to avoid crossing the rotors while spinning. Sealing of the variable volume chambers, which are formed by the rotors in motion, is provided by a moving seal 5 of rotors, a fixed seal 6 along the body and a dynamic seal in the gap between the rotor and body (but the design provided by means of O-rings is possible). The gear 7 of the synchronization system is fixed on the rotor 3 near the center (FIG. 3), which engages the double gear 8 mounted on the rotating bearing, which in turn engages a gear 9, which is also mounted on the rotating bearing on the body support 10, which is rigidly connected with a thin-wall dome 11, which is rigidly connected with the rotor 4. An assembly drawing of the synchronization system is given in FIG. 3.

The gears 7, 8 and 9 are selected to ensure the rotor spinning at equal angular velocities, the gear 8 rotates at a speed equal or close to the rotation speed of the gears 7 and 9, which, as described above, is a significant advantage of the design. Power pick-off from the rotor 3 is provided through the gears 7, 8 and 9, and from the rotor 4—through a dome 11. The gears of the synchronization system have the same rotation speed with rotors in the proposed design.

Power pick-off from the ICE as a whole, is provided through a power pick-off flange 12. The engine is installed on the support 13. The engine is equipped with two external combustion chambers 14 located symmetrically with respect to a point C (see FIG. 1 and FIGS. 6-8), on which an ignition system 15 for gasoline engines or a preheating system for diesel engines is equipped. Different fuel injection systems 16 are possible, starting from direct fuel injection (depicted in FIG. 1) to external fuel injection (on the other end of the ignition chamber entrance on the rotor spinning side) with layered charge distribution.

The intake windows 17 (2 of them) (FIG. 1) are located in one quarter of the body, and on the other end—exhaust windows 18 (2 of them) (view B corresponds to view A, and the image in FIG. 2 is turned through 180 degrees, and there are no positions 11, 8, 9, 12, 10 on it). The rotor positions are read from a sensor 19 to control the injection and ignition system (one of the installation options is shown).

The disadvantage consisting in high peripheral speed of the external engagement rotor gear is eliminated in the proposed design by means of reduction of the gear diameter due to the use of the dome.

The engine is started by the starter. It is easy to see that the rotor spinning cavities intersect at two points. The combustion chambers 14 are located directly near one intersection (point C in FIG. 2), the inlet windows 17 and exhaust windows 18 are arranged near the other intersection (point B in FIG. 2).

In the preferred embodiment the inlet windows 17 are arc-shaped (with a possibility to ensure the variable length L). One of the technically feasible options is to arrange a certain number of solenoid valves located along the arc, which stipulates the inlet window 17 formation, the task of which is to shut off air supply and output into the cavity, where the rotor spins, thereby changing the actual length of the inlet window 17.

Due to the fact that the start of compression stroke takes place at the end (in the farthest point from the point of intersection of the rotor spinning cavities) of the intake window 17, which leads to decrease of the compression stroke volume and return of a portion of air back, the difference of compression and expansion stroke volumes is achieved in case of geometrical equality. Thus, the proposed design addresses the task of obtaining the difference between the compression and expansion stroke volumes due to the extended form of the inlet window 17 of variable length L.

The synchronization system and starter rotation direction determine the spinning direction of the rotors 3 and 4. Let us assume that the rotors spin and are in the position shown in FIG. 2, in which the start of expansion stroke is depicted at the left. The burned air-fuel mixture (hereafter referred to as the AFM) is in the upper combustion chamber of the rotor moving vertically and the start of the compression stroke at the right, with the only specific feature that the start of compression stroke is always postponed till the rotor passes through the entire elongated intake window, which reduces the volume compared to the expansion stroke, and the start of exhaust stroke and intake stroke takes place at the moment at the opposite intersection in a horizontal plane as well. The exhaust gases move to the exhaust windows 18 in a vertical plane to prepare for the exhaust stroke, and fresh air moves from the intake windows 17 to prepare for the compression stroke.

The gases generated in process of the AFM combustion at a pressure of 100 atm and at a temperature of 3000° C. start expanding from the upper combustion chamber at the left of the rotor moving vertically, providing effective power above the rotor moving horizontally. The combustion chambers are dynamically compacted by the rotor toroidal segment bodies. The torque is transferred to another rotor through the synchronization and power pick-off system actuating the rotor. When the rotor moving vertically almost passed the point of the rotor spinning cavity intersection (FIGS. 6-8), and the rotor moving horizontally approached this point, the pressure in the lower combustion chamber reaches the desired values for combustion (AFM), the rotor moving horizontally forms the dynamic seal of the combustion chamber by its body, as well as the rotor moving vertically, and the AFM is ignited. The expansion stroke finishes to the left of the rotor moving vertically, and pressure decreases. While the both rotors continue moving to the position in (FIG. 8), the AFM is burning almost at the constant volume, except for the leakage. Then the process passes to another rotor, and everything is repeated, starting from FIG. 6. Exhaust and intake are performed in the same way near the opposite intersection of the rotor spinning cavities.

The proposed rotary engine has the following features:
- An intermediate shaft is absent, there is high rigidity to torsion oscillations, which leads to a high accuracy of rotor orientation, which in turn decreases the parasitic volume and, consequently, increases efficiency.
- Good manufacturability (low peripheral speeds of gears enable to produce gears at the present state of the art).
- Portability (high specific characteristics).
- Absence of friction bearings.
- Absence of pistons sliding along the cylinder walls, since the rotors are rigid enough and have a plane bending due to loading, which enables to provide minimum clearances to ensure the dynamic seal of the variable volume chambers.

Fine orientation of rotors with respect to the spinning cavity due to the use of rotating bearings.

No gas distribution system.

Combustion takes place in the semipermanent volume (small leaks through the dynamic seal).

No reciprocal motion of elements, since there is only rotary motion.

Possibility of operation at denotation combustion of the AFM (it significantly increases the ICE rotation speed).

There is a possibility of full heat insulation of the design elements.

Dynamic symmetry of rotors and other design elements.

Design elements are workable (they are produced at the present state of the art).

Vibration reduction: 1 revolution of the ICE is 4 expansion strokes (traditional reciprocating ICE—2 expansion strokes)

High torque, high power (all pressure of working gases is transformed into the torque).

High efficiency.

An additional difference of this design compared to existing solutions is the possibility to implement different volumes of compression cycle and expansion stroke, which leads to sharp increase of efficiency, reduction of emissions, exhaust gas pressure and temperature due to the complete combustion of the air-fuel mixture based on the system physical analysis of the ICE. This effect is achieved due to the fact that the start of compression stroke may be "shifted" (along the rotor rotation angle), as a result of the fact that the inlet is provided not out of the hole, but out of the arc of variable length L.

This invention is industrially applicable, since it can be made using the materials and technologies used in production of modern internal combustion engines. The attribute of the claimed invention is a unique assembly and the use of new rotor spinning synchronization system.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A rotary internal combustion engine, comprising:
   a body including four L shaped fragments;
   wherein, when the L-shaped fragments are connected, they form two mutually perpendicular ring-shaped housings with a plurality of ribs on the outer surface and an annular groove inside each housing; and
   wherein the L-shaped fragments further form two passages, each of which contains a torus-shaped rotor adapted to move along the annular groove, and
   wherein each torus-shaped rotor includes longitudinal notches located outside or inside the rotor, forming cavities between the rotor and annular groove surface, and
   the longitudinal notches are connected with combustion chambers located outside the walls, and
   the ring-shaped housings include intake and exhaust ports, the intake port for delivering air into and exchange port for discharging exhaust out of the cavities between the rotor and surfaces of the grooves, and
   wherein, the rotors are interconnected by a kinematic chain of rotation synchronization made of successively engaged gears, one of which is engaged with one torus-shaped rotor, and a least one of the gears is engaged with an output shaft, which is rigidly connected with another torus-shaped rotor in order to provide rotation of the torus-shaped rotors at equal rotation speed.

2. The rotary internal combustion engine of claim 1, wherein the kinematic chain includes two pairs of gears including a common double gear and an outermost gear.

3. The rotary internal combustion engine of claim 1, wherein the ports are elongated along an arc adapted for adjustment of a length of the ports.

\* \* \* \* \*